US011586323B2

(12) United States Patent
Lee et al.

(10) Patent No.: US 11,586,323 B2
(45) Date of Patent: Feb. 21, 2023

(54) TOUCH CIRCUIT AND TOUCH SENSING METHOD

(71) Applicant: LX Semicon Co., Ltd., Daejeon (KR)

(72) Inventors: Jae Hwan Lee, Daejeon (KR); Mun Seok Kang, Daejeon (KR); Jeong Kwon Nam, Daejeon (KR); Kyu Tae Lee, Daejeon (KR); Hyun Soo Chung, Daejeon (KR); Jin Yoon Jang, Daejeon (KR); Hee Ra Yun, Daejeon (KR); Yeon Ju Yu, Daejeon (KR)

(73) Assignee: LX Semicon Co., Ltd., Daejeon (KR)

( * ) Notice: Subject to any disclaimer, the term of this patent is extended or adjusted under 35 U.S.C. 154(b) by 0 days.

(21) Appl. No.: 17/552,245

(22) Filed: Dec. 15, 2021

(65) Prior Publication Data
US 2022/0197473 A1    Jun. 23, 2022

(30) Foreign Application Priority Data

Dec. 18, 2020  (KR) .......................... 10-2020-0179033

(51) Int. Cl.
*G06F 3/041*   (2006.01)
*G06F 3/044*   (2006.01)

(52) U.S. Cl.
CPC ........ *G06F 3/04182* (2019.05); *G06F 3/0446* (2019.05)

(58) Field of Classification Search
CPC ...... G06F 3/041–047; G06F 2203/041–04114; H01L 27/323
See application file for complete search history.

(56) References Cited

U.S. PATENT DOCUMENTS

| 9,030,426 | B2 * | 5/2015 | Edwards ................. G06F 3/044 345/173 |
| 10,678,367 | B1 * | 6/2020 | Gao ........................ G06F 3/044 |
| 10,782,835 | B2 | 9/2020 | Kim |
| 2011/0122089 | A1 * | 5/2011 | Kobayashi ............ G06F 3/0418 345/174 |
| 2012/0268142 | A1 * | 10/2012 | Kremin ................. G06F 3/0446 324/658 |
| 2014/0232690 | A1 | 8/2014 | Huang |
| 2017/0262124 | A1 * | 9/2017 | Gotoh ............... G02F 1/133514 |
| 2018/0090042 | A1 * | 3/2018 | Lin ......................... G09G 3/20 |
| 2019/0385551 | A1 | 12/2019 | Kim et al. |
| 2020/0064950 | A1 | 2/2020 | Kim |
| 2020/0257429 | A1 | 8/2020 | Hisano |

FOREIGN PATENT DOCUMENTS

| KR | 10-2019-0141490 A | 12/2019 |
| KR | 10-2019-0142202 A | 12/2019 |
| KR | 10-2020-0022967 A | 3/2020 |

* cited by examiner

*Primary Examiner* — Sanjiv D. Patel
(74) *Attorney, Agent, or Firm* — Fenwick & West LLP

(57) ABSTRACT

The present disclosure relates to a touch circuit and a touch sensing method. A touch circuit may include a driving circuit configured to transmit a driving signal to a touch electrode, a sensing circuit configured to sense a change in capacitance generated in the touch electrode, and a touch control circuit configured to control a polarity of the driving signal transmitted by the driving circuit. The polarity of the driving signal controlled by the touch control circuit may be determined based on a location of the touch electrode. Touch sensitivity can be improved by differently controlling a polarity of a driving signal transmitted to an adjacent touch electrode.

18 Claims, 12 Drawing Sheets

TOUCH CIRCUIT AND TOUCH SENSING METHOD

CROSS-REFERENCES TO RELATED APPLICATION

This application claims priority from Korean Patent Application No. 10-2020-0179033, filed on Dec. 18, 2020, which is hereby incorporated by reference for all purposes as if fully set forth herein.

BACKGROUND OF THE DISCLOSURE

Field of the Disclosure

The present embodiment relates to a touch circuit capable of sensing a change in capacitance of a touch electrode, and particularly, to a touch circuit capable of touch sensing by using a polarity mixing driving method, a touch screen panel including the touch circuit, and a touch sensing method of a display device.

Related Art

A technology for recognizing an external object that approaches or touches a touch screen panel (TSP) is called a touch sensing technology. The TSP is placed at the same location as a display panel on a plane. Accordingly, a user may input a user manipulation signal to the TSP while watching an image of the display panel. Such a method of generating a user manipulation signal provides excellent user intuition compared to another user manipulation signal input method (e.g., a mouse input method or a keyboard input method).

The touch sensing technology is applied to various electronic devices including display panels owning to such an advantage. A touch circuit may supply a driving signal to a driving electrode disposed in the TSP, may receive a response signal generated in a sensing electrode, and may sense a touch or proximity of an external object for the TSP. The TSP generates capacitance between the driving electrode and the sensing electrode. A change in the capacitance may indicate a touch or proximity of the external object.

In the touch sensing using a capacitance method, an object and a ground state of the TSP may affect touch sensitivity. In general, when touching the panel, the object changes capacitance of a touch electrode. The touch circuit may sense a change in capacitance of the touch electrode, and may determine whether an external object touches the panel based on the change in the capacitance.

However, when the ground state of the TSP is weak, small capacitance is formed between the touch electrode and the object. Although the object approaches the touch electrode, a change in capacitance of the sensing electrode becomes small. A state in which the ground state of the TSP is weak is called a low ground mass (LGM) state. There is a need to develop a technology for improving touch sensitivity in the LGM state.

SUMMARY

In this background, in an aspect, various embodiments are directed to providing a technology for improving touch sensitivity in the LGM state.

In this background, in another aspect, various embodiments are directed to providing a technology for differently setting a polarity of a driving voltage of an adjacent touch electrode and reducing a retransmission phenomenon in which a driving signal supplied to another electrode is introduced as noise into a response signal.

In order to accomplish the aforementioned objects, in one aspect, an embodiment of the present disclosure may provide a touch circuit including a driving circuit configured to transmit a driving signal to a touch electrode, a touch sensing circuit configured to sense a change in capacitance, generated in the touch electrode, through a sensing line, and a touch control circuit configured to control a polarity of the touch driving signal transmitted by the touch driving circuit. The polarity of the driving signal controlled by the touch control circuit may be determined based on a location of the touch electrode.

In the touch circuit, the touch electrodes may include a plurality of Tx electrodes and a plurality of Rx electrodes intersecting with each other. The Tx electrodes may receive touch driving signals having different polarities, transmitted by the touch driving circuit. The Rx electrodes may transmit, to the touch sensing circuit, touch sensing signals generated by a touch or proximity of an object.

In the touch circuit, the touch driving circuit may transmit a first touch driving signal to touch electrodes defined as one group and may transmit a second touch driving signal, having a phase different from a phase of the first touch driving signal, to touch electrodes adjacent to the group of the touch electrodes.

In the touch circuit, the touch control circuit may control touch driving voltages, transmitted to odd-numbered sensing lines and to even-numbered sensing lines in one direction to respectively have different polarities.

In the touch circuit, the touch sensing circuit may include an amplifier configured to amplify a touch sensing signal corresponding to a change in the capacitance generated in the touch electrode, a switch configured to receive a sensing mode signal, generated by the touch control circuit, to indicate a single mode or a differential mode and to select a connection between the amplifier and an analog-to-digital converter according to the touch sensing mode signal, and an analog-to-digital converter configured to convert the touch sensing signal in an analog form into the touch sensing signal in a digital form.

In the touch circuit, the touch control circuit may divide touch sensing signals into a plurality of groups by determining polarities of the touch sensing signals transmitted to the touch sensing circuit, and may determine common noise of the touch sensing signals of each group.

In the touch circuit, the touch control circuit may control the touch driving circuit to supply the touch driving signals having different polarities in different times.

In order to accomplish the aforementioned objects, in another aspect, an embodiment of the present disclosure may provide a touch circuit including a read-out circuit configured to transmit a touch driving signal to a touch electrode and receive a touch sensing signal from the touch electrode and a touch control circuit configured to control the driving signal of the read-out circuit. The touch control circuit may control touch driving signals transmitted to two adjacent touch electrodes to have different polarities.

In the touch circuit, the read-out circuit may include a plurality of analog signal processing circuits configured to receive the touch sensing signals respectively from different sensing lines.

In the touch circuit, the read-out circuit may include one or more common sensing lines and receive touch sensing signals having a same polarity through the one or more common sensing lines.

In the touch circuit, the touch control circuit may determine the polarity of the touch sensing signal and control an analog signal processing circuit based on the polarity of the touch sensing signal so that a common sensing line is formed.

In the touch circuit, the touch control circuit may calculate common noise of the touch sensing signals using the common sensing line.

In order to accomplish the aforementioned objects, in still another aspect, an embodiment of the present disclosure may provide a touch sensing method including determining a phase of a first touch driving voltage transmitted to a first touch electrode, determining a phase of a second touch driving voltage having an opposite polarity to a polarity of the first touch driving voltage, transmitted to the second touch electrode, and alternately transmitting the first touch driving voltage and the second touch driving voltage to adjacent touch electrodes.

The touch sensing method may further include determining whether polarities of touch sensing signals transmitted from the first touch electrode and the second touch electrode are identical.

The touch sensing method may further include defining touch sensing signals having a same polarity as a group and simultaneously sensing the touch sensing signals of each group.

As described above, according to the present embodiment, touch sensitivity in the LGM state can be improved.

Furthermore, according to the present embodiment, the retransmission phenomenon in which a driving signal supplied to another electrode is introduced as noise into a response signal in the LGM state can be reduced by a polarity mixing driving method, and touch sensitivity can be improved.

DETAILED DESCRIPTION

Figure 1:
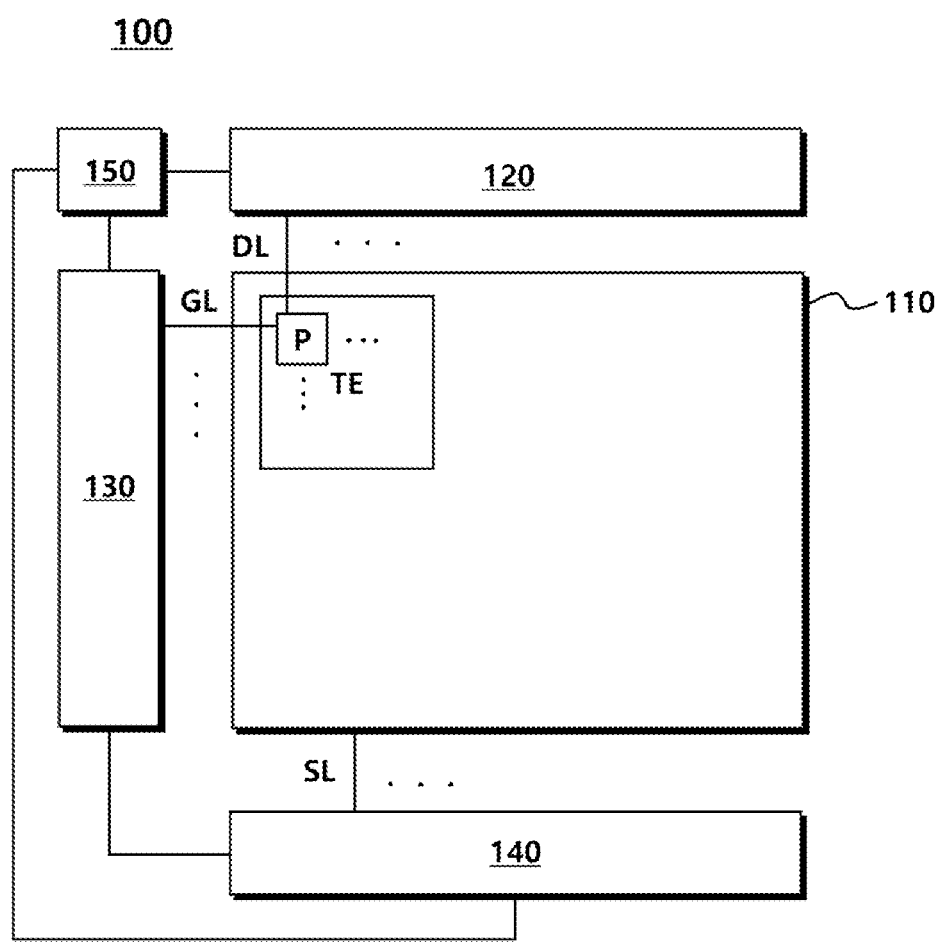
FIG. 1 is a configuration diagram of a display device according to an embodiment.

FIG. 1 is a configuration diagram of a display device according to an embodiment.

Referring to FIG. 1, a display device 100 may include a panel 110, a data driving circuit 120, a gate driving circuit 130, a touch circuit 140, a control circuit 150, etc.

A plurality of data lines DL connected to the data driving circuit 120 and a plurality of gate lines GL connected to the gate driving circuit 130 may be formed in the panel 110. Furthermore, multiple pixels P corresponding to respective intersection points of the plurality of data lines DL and the plurality of gate lines GL may be defined in the panel 110.

A transistor having a first electrode (e.g., a source electrode or a drain electrode) connected to the data line DL, a gate electrode connected to the gate line GL, and a second electrode (e.g., a drain electrode or a source electrode) connected to a display electrode may be formed in each of the pixels P.

Furthermore, a plurality of touch electrodes TE may be isolated from one another and further formed in the panel 110. One pixel P or multiple pixels P may be disposed in an area in which the touch electrode TE is disposed.

The panel 110 may include a display panel and a touch screen panel (TSP). In this case, the display panel and the TSP may share some elements with each other. For example, a plurality of touch electrodes TE may be one element (e.g., a common electrode for applying a common voltage) of the display panel, and may also be one element (a touch electrode for sensing a touch) of the TSP. In an aspect in which the display panel and the TSP share some elements with each other, the panel 110 is called an integrated type panel, but the present disclosure is not limited thereto. Furthermore, an in-cell type panel has been known as a form in which some elements of the display panel and the TSP are shared, but this is merely an example of the panel 110. A panel to which the present disclosure is applied is not limited to such an in-cell type panel.

The data driving circuit 120 supplies a data signal to the data line DL in order to display an image in each pixel P of the panel 110.

The data driving circuit 120 may include at least one data driver integrated circuit. The at least one data driver integrated circuit may be connected to a bonding pad of the panel 110 or may be directly formed in the panel 110 by using a tape automated bonding (TAB) method or a chip on glass (COG) method. According to circumstances, the at least one data driver integrated circuit may be integrated and formed in the panel 110. Furthermore, the data driving circuit 120 may be implemented using a chip on film (COF) method.

The gate driving circuit 130 sequentially supplies a scan signal to the gate lines GL in order to turn on or off the transistors disposed in the pixels P, respectively.

Depending on a driving method, the gate driving circuit 130 may be disposed only on one side of the panel 110 as illustrated in FIG. 1 or may be divided into two and disposed on both sides of the panel 110.

Furthermore, the gate driving circuit 130 may include at least one gate driver integrated circuit. The at least one gate driver integrated circuit may be connected to a bonding pad of the panel 110 or may be implemented in a gate in panel (GIP) type and directly formed in the panel 110 by using the TAB method or the COG method. According to circumstances, the at least one gate driver integrated circuit may be integrated and formed in the panel 110. Furthermore, the gate driving circuit 130 may be implemented using the COF method.

The touch circuit 140 applies a driving signal to some or all of a plurality of touch electrodes TE connected to a sensing line SL.

As illustrated in FIG. 1, the touch circuit 140 may be disposed outside the data driving circuit 120 and the gate driving circuit 130 as an element separate from the data driving circuit 120 and the gate driving circuit 130, but may be implemented as an internal element of another separate driver integrated circuit, including at least one of the data driving circuit 120 and the gate driving circuit 130, or may be implemented as an internal element of the data driving circuit 120 or the gate driving circuit 130 depending on an implementation method.

Accordingly, to apply, by the touch circuit 140, a driving signal to some or all of the plurality of touch electrodes TE may be considered to apply, by a separate driver integrated circuit including the touch circuit 140, a driving signal to some or all of the plurality of touch electrodes TE. Furthermore, this may be considered to apply, by the data driving circuit 120 or the gate driving circuit 130 including the touch circuit 140, a driving signal to some or all of the plurality of touch electrodes TE depending on a design method.

The touch circuit 140 is not limited to an implementation and design method, and may be another element itself or may be an element disposed inside or outside another element if only functions described in this specification and performed by the touch circuit 140 are identical or similar.

Furthermore, in FIG. 1, one touch circuit 140 has been illustrated as being disposed in the display device 100, but the display device 100 may include two or more touch circuits 140.

In order to apply the driving signal to some or all of the plurality of touch electrodes TE, the touch circuit 140 requires the sensing line SL connected to each of the plurality of touch electrodes TE. Accordingly, the sensing line SL that is connected to each of the plurality of touch electrodes TE and transmits the driving signal may be formed in the panel 110 in a first direction (e.g., a longitudinal direction) or a second direction (e.g., a transverse direction).

The display device 100 may adopt a capacitive touch method of recognizing a proximity or touch of an object by sensing a change in capacitance through the touch electrode TE.

The capacitive touch method may be divided into a mutual-capacitive touch method and a self-capacitive touch method, for example.

In the mutual-capacitive touch method, that is, one type of capacitive touch method, a driving signal is applied to one touch electrode (e.g., a Tx electrode), and the other touch electrode (e.g., an Rx electrode) coupled to the Tx electrode is sensed. In such a mutual-capacitive touch method, a value sensed in the Rx electrode is different depending on a proximity or touch of an object, such as a finger or a pen. In the mutual-capacitive touch method, whether the panel is touched, touch coordinates, etc. are detected based on such a sensing value in the Rx electrode.

In the self-capacitive touch method, that is, another type of capacitive touch method, after a driving signal is applied to one touch electrode TE, the corresponding one touch electrode TE is sensed. In such a self-capacitive touch method, a value sensed in the corresponding one touch electrode TE is different based on a proximity or touch of an object, such as a finger or a pen. In the self-capacitive touch method, whether the panel is touched, touch coordinates, etc. are detected based on such a sensing value. In the self-capacitive touch method, a Tx electrode and an Rx electrode are not distinguished because one touch electrode TE applies a driving signal and senses a value.

The display device 100 may adopt one of the two capacitive touch methods (i.e., the mutual-capacitive touch method and the self-capacitance touch method). In this specification, however, an embodiment is described based on the assumption that the self-capacitive touch method is adopted, for convenience of description.

The display device 100 may divide the section of the touch electrode TE into a display section and a touch section, and may drive the display section and the touch section. For example, the touch circuit 140 of the display device 100 may not apply a driving signal to some or all of the touch electrodes TE in a section in which a data signal is supplied.

Furthermore, the display device 100 may drive the touch electrode TE without distinguishing between the display section and the touch section. For example, the touch circuit 140 of the display device 100 may apply a driving signal to some or all of the touch electrodes TE in a section in which a data signal is supplied.

The control circuit 150 may supply various control signals to the data driving circuit 120, the gate driving circuit 130 and the touch circuit 140. The control circuit 150 may transmit a data control signal (DCS) that controls the data driving circuit 120 to supply a data voltage to each pixel P based on each timing, may transmit a gate control signal (GCS) to the gate driving circuit 130, may transmit a sensing signal to the touch circuit 140. The control circuit 150 may be a timing controller (T-Con) or may include a timing controller and further perform another control function.

Figure 2:
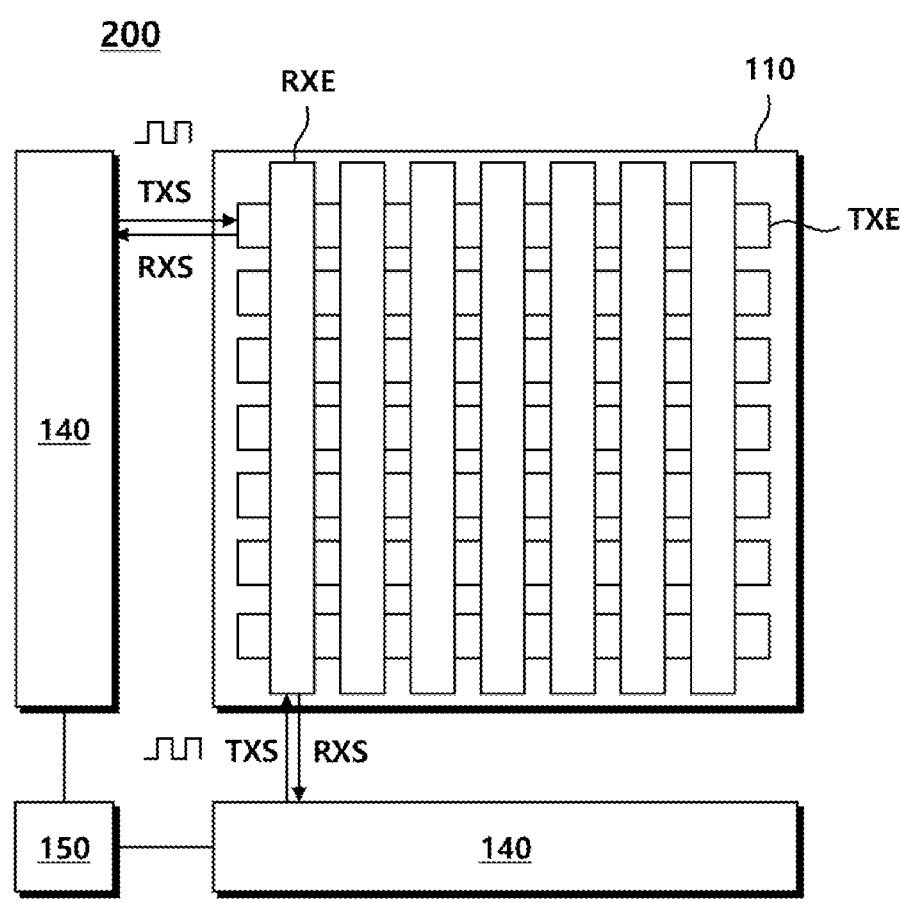
FIG. 2 is a diagram for describing a touch sensing process according to an embodiment.

FIG. 2 is a diagram for describing a touch sensing process according to an embodiment.

Referring to FIG. 2, the panel 110 may include a plurality of touch electrodes TXE in the first direction, a plurality of touch electrodes RXE in the second direction, etc.

The first direction and the second direction may be defined as an x-axis direction and a y-axis direction, respectively, but may be defined depending on a design condition.

The touch circuit 140 may operate using a mutual-capacitive method or may operate using a self-capacitive method. As occasion demands, in the self-capacitive method, the plurality of touch electrodes TXE in the first direction and the plurality of touch electrodes RXE in the second direction may mean the same touch electrodes.

The touch circuit 140 may supply a driving signal TXS to the touch electrode TXE. The driving signal TXS may be a signal having a voltage or current form. The driving signal TXS having a voltage form may be defined as a driving voltage. The driving signal may include one driving cycle consisting of a first period and a second period.

When the touch circuit 140 operates using the mutual-capacitive method, the plurality of touch electrodes TXE in the first direction and the plurality of touch electrodes RXE in the second direction may be coupled by capacitance. Through such coupling, a signal having an AC waveform, which is supplied to the touch electrode TXE, may be transmitted to the touch electrode RXE.

The touch circuit 140 may supply the driving signal TXS to the touch electrode RXE, may receive a response signal RXS from the touch electrode RXE, and may sense a touch or proximity of an object 10 for the panel 110 by demodulating the response signal RXS. The response signal RXS may be a signal having a current or voltage form.

As occasion demands, the touch circuit 140 may operate while changing its mode. For example, the touch circuit 140 may operate in a self-capacitive mode and operate after changing the self-capacitive mode into a mutual-capacitive mode, and vice versa.

In the self-capacitive mode, a touch driving circuit (not illustrated) may supply the driving signal TXS to the Tx electrode TXE, may receive the response signal RXS from the Tx electrode TXE, and may generate touch data for the response signal RXS. Furthermore, the touch driving circuit (not illustrated) may supply the driving signal TXS to the Rx electrode RXE, may receive the response signal RXS from the Rx electrode RXE, and may generate digital data for the response signal RXS. The driving circuit may calculate touch coordinates based on touch sensing signals received from the Tx electrode and the Rx electrode, respectively.

When the TSP is in a low ground mass (LGM) state (e.g., when a user does not grasp the display device with his or her hand), touch sensitivity may be reduced because a driving signal supplied to another electrode is introduced into a response signal in the form of noise.

Figure 3:
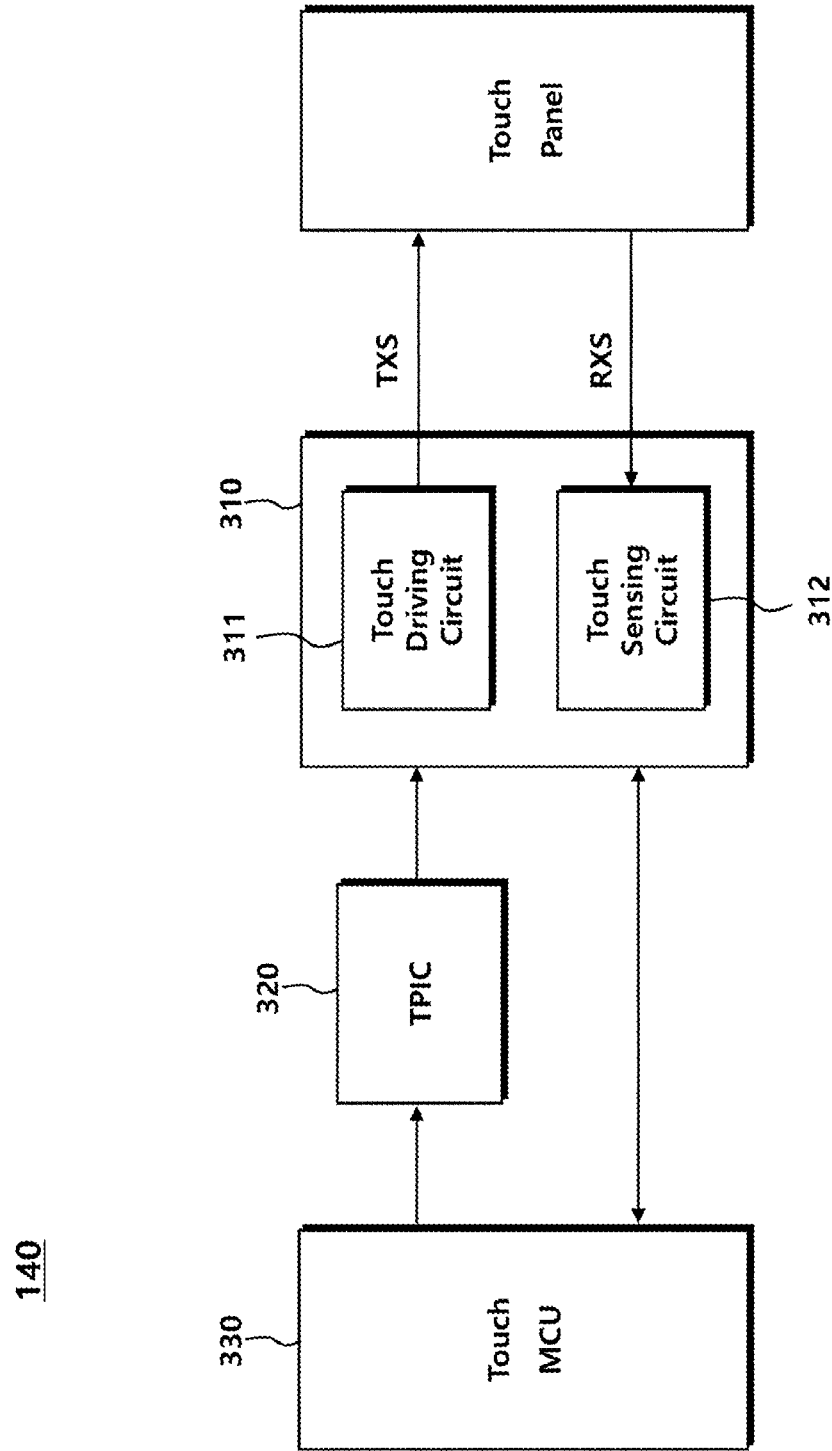
FIG. 3 is a configuration diagram of a touch circuit according to an embodiment.

FIG. 3 is a configuration diagram of a touch circuit according to an embodiment.

Referring to FIG. 3, the touch circuit 140 may include a read-out circuit 310, a touch power circuit 320, a touch control circuit 330, etc.

The read-out circuit 310 may supply a touch electrode with a driving signal TXS (e.g., a driving voltage) having predetermined amplitude. A touch driving circuit 311 included in the read-out circuit 310 may transmit the driving signal TXS having amplitude changed from amplitude of the control signal of the touch control circuit 330. Furthermore, a touch sensing circuit 312 included in the read-out circuit 310 may receive, from the touch electrode, a response signal RXS for the driving signal TXS, and may sense a touch or proximity of an external object for the panel. The touch sensing circuit 312 may generate touch sensing data (e.g., a touch sensing value) by demodulating the response signal RXS.

The driving signal TXS and response signal RXS of the read-out circuit 310 may be square wave signals or sine wave signals.

The touch power circuit 320 may generate various power signals including a reference voltage signal and a driving voltage necessary to drive the panel 110, and may supply the various power signals to the read-out circuit 310, the touch control circuit 330, etc. As occasion demands, the touch power circuit 320 may be defined as a touch power integrated circuit (TPIC).

The touch control circuit 330 may generate a control signal CS in order to control the read-out circuit 310 and the touch power circuit 320. When the touch control circuit 330 transmits the control signal CS to the read-out circuit 310 and the touch power circuit 320, the touch driving circuit 311 and the touch sensing circuit 312 may operate in response to the control signal CS. As occasion demands, the touch control circuit 330 may be defined as a micro controller unit (MCU).

Figure 4:
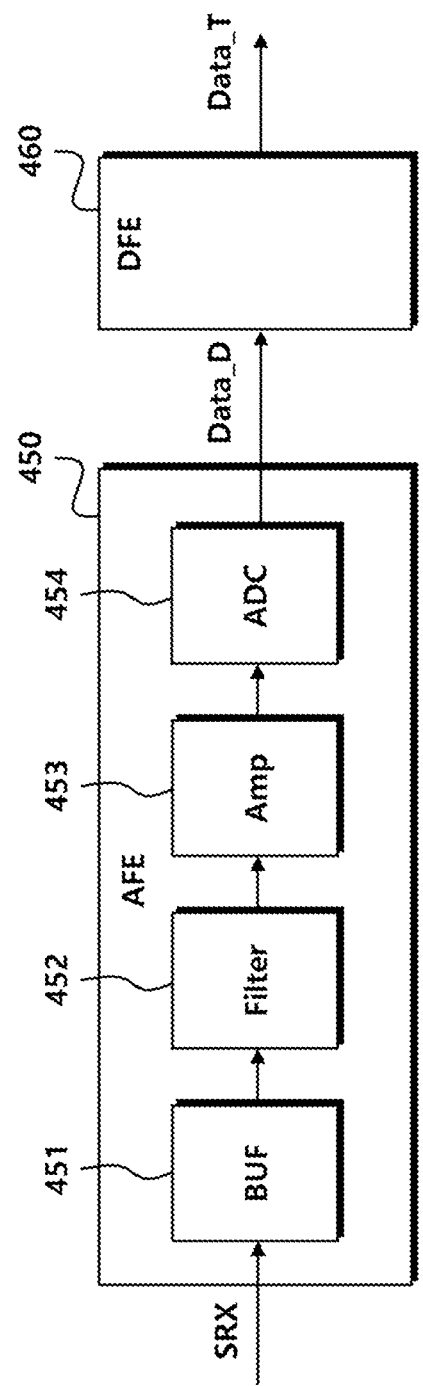
FIG. 4 is a configuration diagram of a read-out circuit according to an embodiment.

FIG. 4 is a configuration diagram of the read-out circuit according to an embodiment.

Referring to FIG. 4, the touch sensing circuit 312 of the read-out circuit 310 may include an analog signal processing circuit 450, a digital signal processing circuit 460, etc. in order to process a received sensing signal SRX. As occasion demands, the analog signal processing circuit 450 may be defined as an analog front end (AFE), and the digital signal processing circuit 460 may be defined as a digital front end (DFE).

The analog signal processing circuit 450 may include a buffer 451, a filter 452, an amplifier 453, an analog-to-digital converter (ADC) 454, etc.

The buffer 451 may perform an operation of receiving the sensing signal SRX. For example, the buffer 451 may receive a sensing signal in a current form and transmit the sensing signal to the filter without any change, or may receive a sensing signal in a capacitance form, may convert the sensing signal into a signal having a current form, and may transmit the sensing signal to the filter. Furthermore, the buffer 451 may receive a sensing signal in a current form, and may generate an output signal obtained by converting the sensing signal having the current form into a signal having a voltage form.

The buffer 451 may form a single buffer for processing a single input signal, or may include differential input buffers for receiving two or more input signals.

The filter 452 may remove or reduce a frequency band attributable to noise among frequencies of sensing signals. For example, the filter 452 may be a band pass filter having a band pass and a stop pass on the basis of a block frequency. Furthermore, the filter 452 may include one or more high pass filters or one or more low pass filters. As occasion demands, a filter system may be formed by combinations of the one or more high pass filters or the one or more low pass filters.

The sensing signal SRX may include a plurality of signals having different frequencies, and may include signals having a frequency band attributable to noise. A noise signal having a given frequency band can be removed or reduced and more accurate touch sensing data can be obtained by the filter 452.

The amplifier 453 may generate an analog amplification signal by amplifying the output signal of the filter.

The ADC 454 may generate digital data Data_D through analog-to-digital conversion for the analog amplification signal.

The sequence and arrangement of the buffer 451, filter 452, amplifier 453, and ADC 454 of the analog signal processing circuit 450 are not limited to the form illustrated in FIG. 4, and may have various forms.

Figure 5:
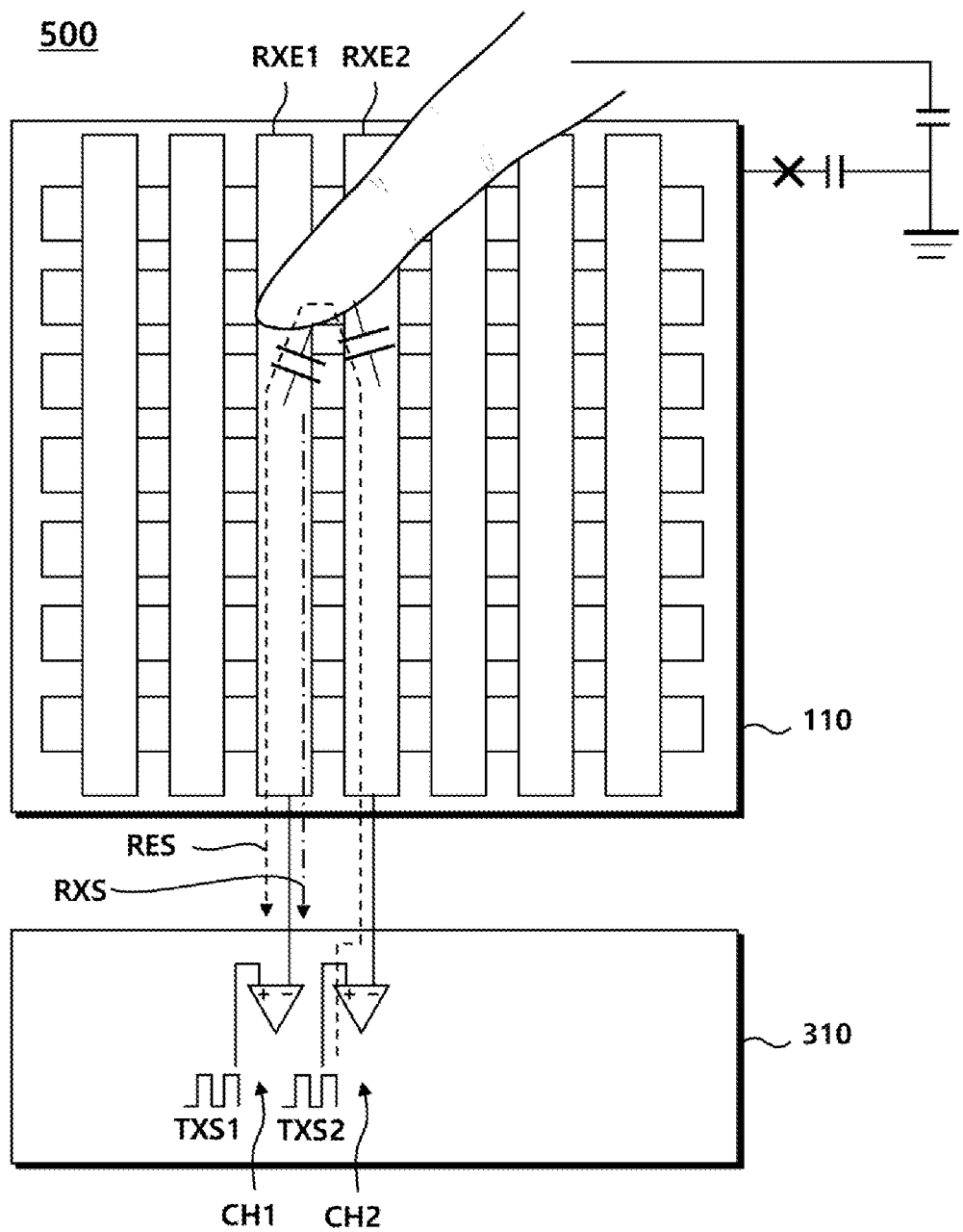
FIG. 5 is a diagram for describing a retransmission phenomenon in which a driving signal supplied to another electrode is introduced as noise into a response signal in an LGM state.

FIG. 5 is a diagram for describing a retransmission phenomenon in which a driving signal supplied to another electrode is introduced as noise into a response signal in the LGM state.

Referring to FIG. 5, the touch driving circuit (not illustrated) of the read-out circuit 310 may simultaneously supply driving signals TXS1 and TXS2 to two adjacent sensing electrodes RXE1 and RXE2 by using two channels CH1 and CH2, respectively.

In the LGM state in which the panel 110 has not been connected to the ground, a current path is not formed between an object, the ground, and the panel 110. Accordingly, the second driving signal TXS2 supplied to the second sensing electrode RXE2 may flow into the first sensing electrode RXE1 through capacitance formed between the two sensing electrodes RXE1 and RXE2 and the object. When it is said that a signal formed in the first sensing electrode RXE1 due to the second driving signal TXS2 is a retransmission signal RES, a response signal RXS attributable to the first driving signal TXS1 and the retransmission signal RES are simultaneously formed in the first sensing electrode RXE1.

From a viewpoint of the first channel CHL the retransmission signal RES is recognized as noise, so that touch sensitivity is reduced.

In order to minimize the influence of a retransmission signal and improve touch sensitivity, the touch circuit according to an embodiment may drive two adjacent sensing electrodes so that they have voltage signals having different polarities.

Figure 6:
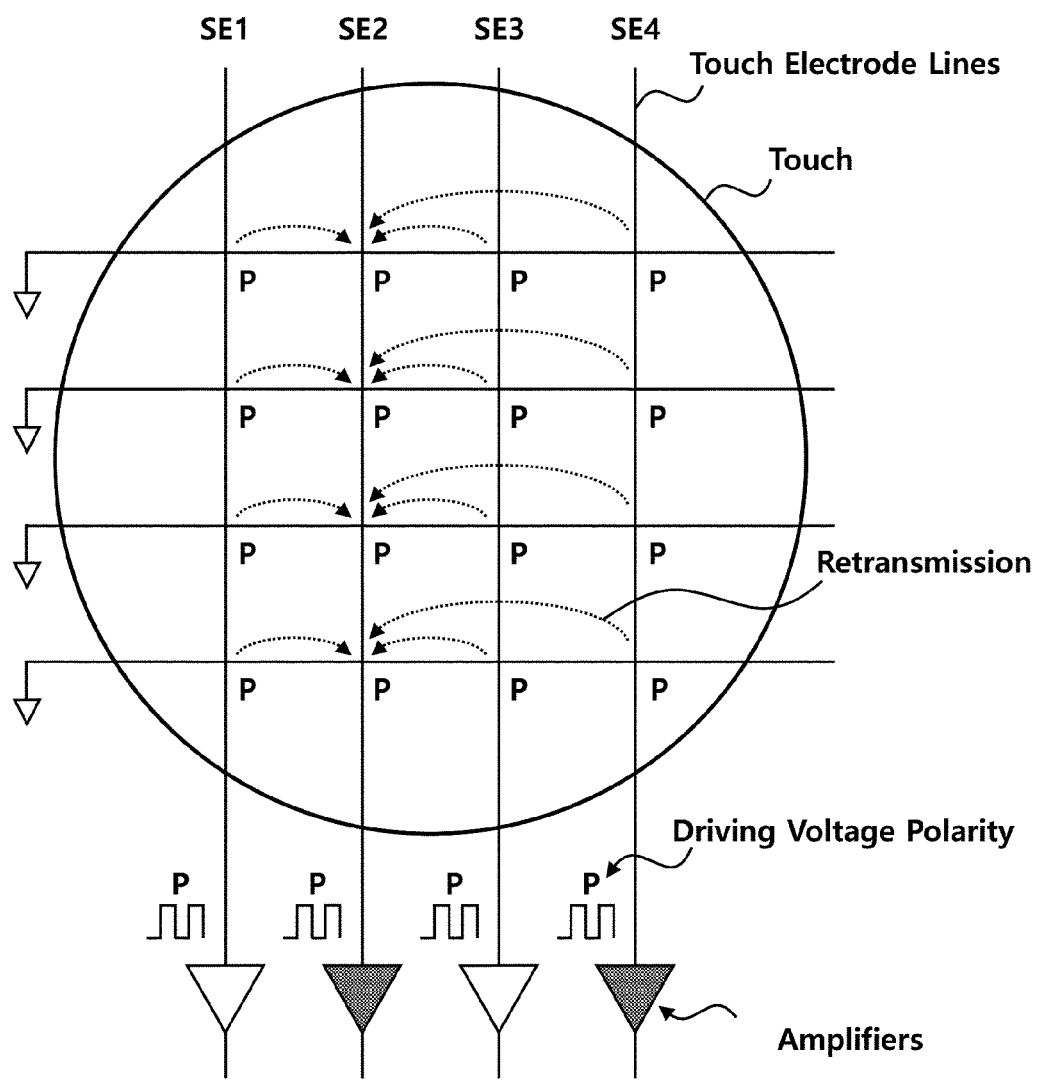
FIG. 6 is a diagram for describing a retransmission phenomenon occurring when driving signals having the same polarity are supplied.

FIG. 6 is a diagram for describing a retransmission phenomenon occurring when driving signals having the same polarity are supplied.

Referring to FIG. 6, a display device 600 may include a first touch electrode line SE1, a second touch electrode line SE2, a third touch electrode line SE3, a fourth touch electrode line SE4, etc.

The amplifier of a touch driving circuit (not illustrated) of the read-out circuit may transmit a driving voltage to each touch electrode line. The touch sensing circuit (not illustrated) of the read-out circuit may sense a change in capacitance of each touch electrode line attributable to a touch or proximity of an object.

In this case, in a conventional touch sensing technology, voltages transmitted to all the lines of touch electrodes are driven as voltages having the same polarity.

If the driving voltages having the same polarity are transmitted to the respective touch electrodes in the LGM state, a retransmission phenomenon in which a retransmission signal is transmitted to an adjacent touch electrode occurs.

For example, when touch sensing is performed in the second touch electrode line SE2, capacitance formed between the first touch electrode line SE1, the third touch electrode line SE3, the fourth touch electrode line SE4, and an object may be delivered to the second touch electrode line SE2 and sensed. In this case, a retransmission signal introduced due to an adjacent touch electrode may be defined as noise.

In particular, such a retransmission phenomenon chiefly occurs when a palm touch occurs in the LGM state or a touch on a plurality of touch electrodes occurs. Such a phenomenon acts as a factor to degrade touch sensitivity.

When a retransmission signal is introduced into a touch sensing line, a negative touch may occur. In this case, touch sensitivity is degraded.

Figure 7:
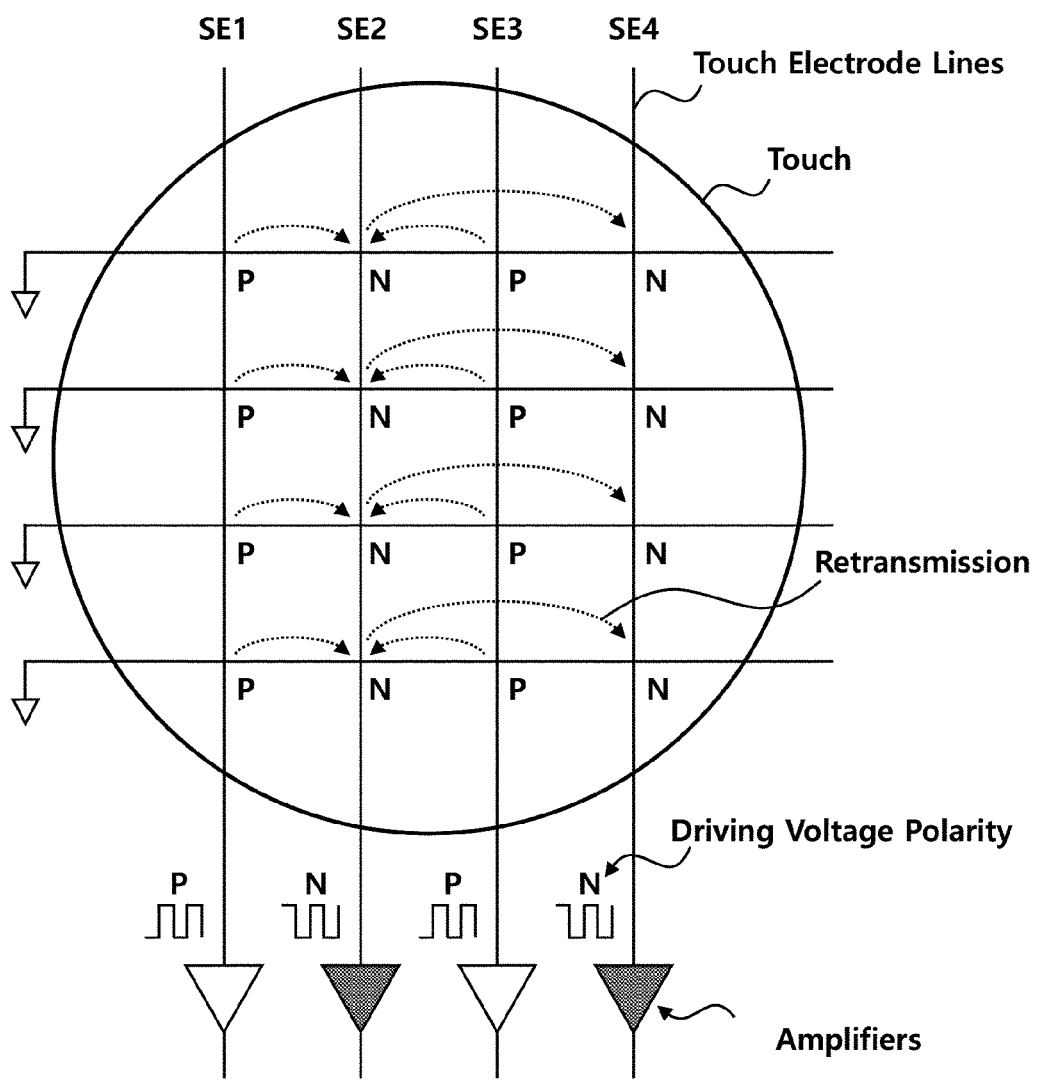
FIG. 7 is a diagram for describing a method of reducing a retransmission phenomenon by using a polarity mixing driving method according to an embodiment.

FIG. 7 is a diagram for describing a method of reducing a retransmission phenomenon by using a polarity mixing driving method according to an embodiment.

Referring to FIG. 7, a display device 700 may include a first touch electrode line SE1, a second touch electrode line SE2, a third touch electrode line SE3, a fourth touch electrode line SE4, etc.

A touch driving signal having a first polarity may be transmitted to the first touch electrode line SE1 and the third touch electrode line SE3. A touch driving signal having a second polarity may be transmitted to the second touch electrode line SE2 and the fourth touch electrode line SE4.

The touch driving signal having the first polarity and the touch driving signal having the second polarity may have opposite polarities. The opposite polarities may mean a case where a phase difference is 180 degrees.

As occasion demands, the first polarity and the second polarity may be differently defined and used as polarities capable of decreasing the introduction of a retransmission signal.

When a polarity of the first touch electrode line SE1 is positive (P) or (+), a polarity of the second touch electrode line SE2 may be negative (N) or (−). This may mean that only the polarity of a signal having the same amplitude and cycle has been inverted.

A polarity or phase of a driving voltage transmitted to each touch electrode of the display device 700 may be controlled for each sensing line, pixel or sub-pixel.

If a polarity of a driving voltage transmitted to an adjacent touch sensing line is opposite, the introduction of a retransmission signal can be prevented. More specifically, if polarities of adjacent sensing lines are opposite to each other, a retransmission signal can be offset.

Figure 8:
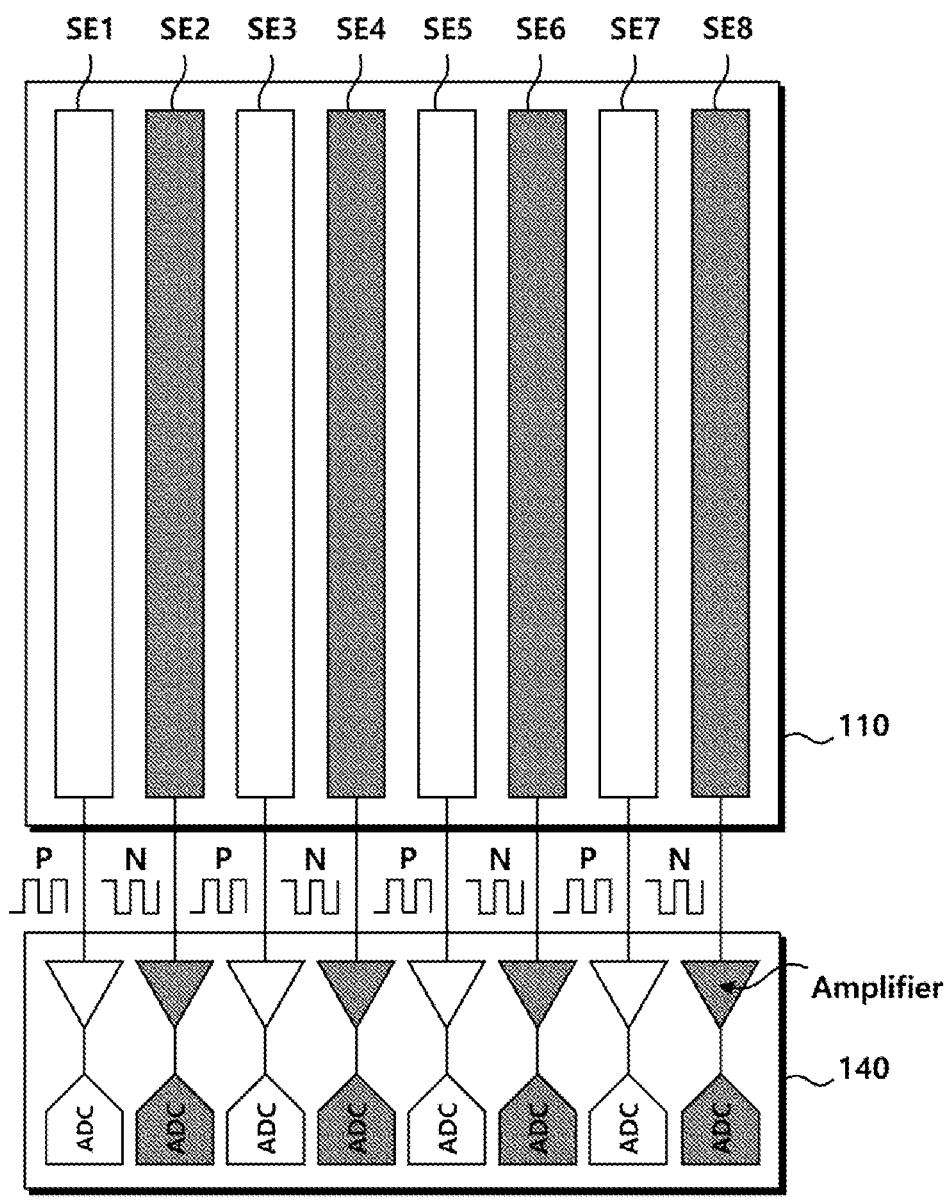
FIG. 8 is a diagram illustrating a method of receiving, by the touch circuit, a touch sensing signal in a first sensing mode according to an embodiment.

FIG. 8 is a diagram illustrating a method of receiving, by the touch circuit, a touch sensing signal in a first sensing mode according to an embodiment.

Referring to FIG. 8, the panel 110 of a display device 800 may include a first touch sensing line SE1, a second touch sensing line SE2, a third touch sensing line SE3, a fourth touch sensing line SE4, a fifth touch sensing line SE5, a sixth touch sensing line SE6, a seventh touch sensing line SE7, an eighth touch sensing line SE8, etc.

The touch circuit 140 may control polarities of driving voltages transmitted to the touch sensing lines SE1, SE2, SE3, SE4, SE5, SE6, SE7, and SE8 of the panel 110, respectively. As occasion demands, the touch circuit 140 may control a polarity of a driving voltage transmitted from the touch driving circuit (not illustrated) of the read-out circuit to each touch sensing line by generating a polarity control signal or may control a polarity of a sensing voltage transmitted from each touch sensing line to the touch sensing circuit (not illustrated) of the read-out circuit.

Each touch sensing line may be connected to a separate analog signal processing circuit (not illustrated). A received analog signal may be separately stored and calculated in a touch control circuit (not illustrated).

A method of separately performing sensing for each touch sensing line may be defined as a touch sensing method based on a single sensing mode.

Figure 9:
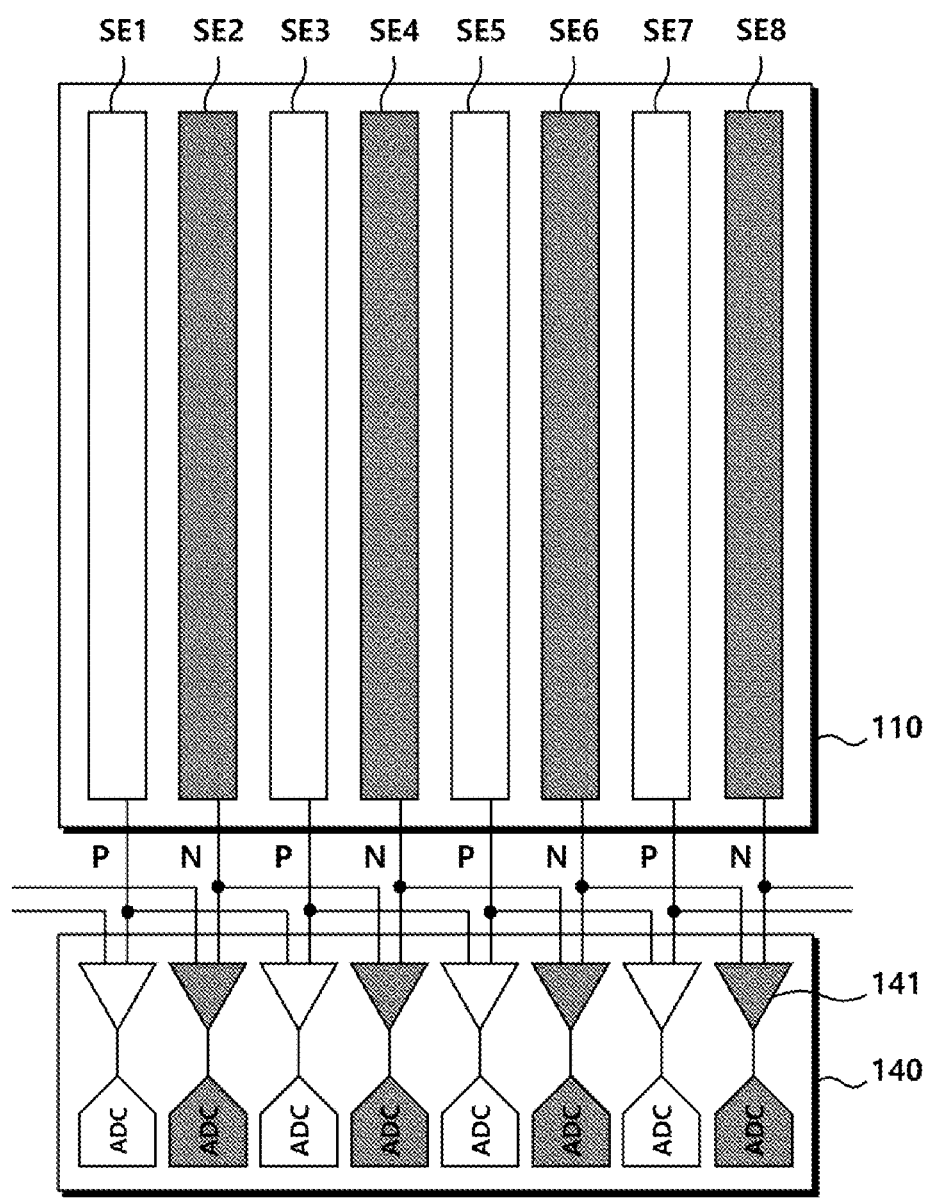
FIG. 9 is a diagram illustrating a method of receiving, by the touch circuit, a touch sensing signal in a second sensing mode according to an embodiment.

FIG. 9 is a diagram illustrating a method of receiving, by the touch circuit, a touch sensing signal in a second sensing mode according to an embodiment.

Referring to FIG. 9, the panel 110 of a display device 900 may include a first touch sensing line SE1, a second touch sensing line SE2, a third touch sensing line SE3, a fourth touch sensing line SE4, a fifth touch sensing line SE5, a sixth touch sensing line SE6, a seventh touch sensing line SE7, an eighth touch sensing line SE8, etc.

The touch circuit 140 may define the touch sensing lines SE1, SE3, SE5, and SE7 as a first group and control the first group to have the same polarity, and may define the touch sensing lines SE2, SE4, SE6, and SE8 as a second group and control the second group to have the same polarity. As occasion demands, the touch sensing lines of the panel 110 may be defined as one or more groups and may be differently defined for each area of touch electrodes.

A polarity of driving voltages of the first group may be a voltage having a first polarity defined as a P polarity. A polarity of driving voltages of the second group may be a voltage having a second polarity defined as an N polarity.

All the lines for the respective groups may be connected to the analog signal processing circuit (not illustrated). In this case, characteristics of common noise of each group may be determined, and a temperature change or degradation of each group may be determined.

If each group is configured so that adjacent touch sensing lines cross each other, even though a palm touch on the panel occurs in the LGM state, a retransmission signal can be mutually offset by driving voltages having opposite polarities. Accordingly, touch sensitivity can be improved because a negative touch can be decreased.

A method of dividing touch sensing lines into groups and performing sensing by group may be defined as a touch sensing method based on a differential sensing mode.

The touch circuit 140 may further comprise amplifiers 141, connected with sensing lines, to determine common noise of touch sensing signals. The amplifiers 141 may be connected with a common sensing line and compare signals received through the common sensing line to determine noise of each touch sensing signal.

An amplifier 141 may receive touch sensing signals having a same polarity through a common sensing line and determine common noise. The connection between the amplifiers 141 and the sensing lines may be as shown in FIG. 9, however, the embodiments are not limited thereto as long as common noise can be determined.

An amplifier 141 may be connected with a plurality of sensing lines of a same polarity and determine a difference between touch sensing signals of the connected sensing lines.

Since a chain of connections between amplifiers 141 and the sensing lines is made, the accuracy in noise measurement may be improved. Common noise measured by an amplifier 141 may be reflected in the operation of the touch driving circuit or the touch sensing circuit and decrease differences between the touch sensing in different time sections.

For example, the touch control circuit may identify noise of a touch sensing signal generated in a touch electrode and change the intensity of a touch sensing signal in order to improve the accuracy of a touch sensing.

Here, a common sensing line may be defined as a circuit configuration and a connection for transmitting signals to an amplifier 141 by connecting the amplifier with sensing lines using a common node at one point of a sensing line.

Figure 10:
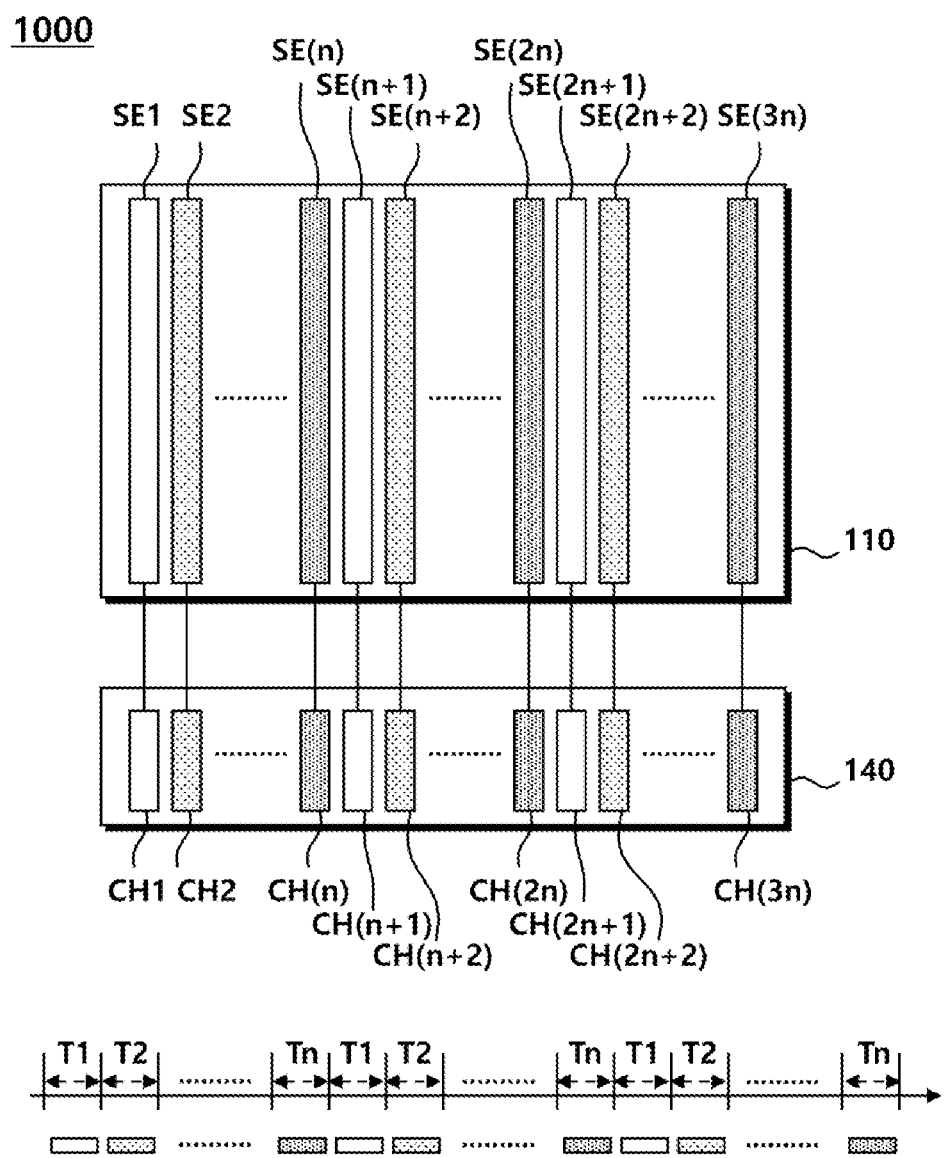
FIG. 10 is a diagram illustrating a method of driving, by a touch driving circuit of the touch circuit, a touch electrode according to an embodiment.

FIG. 10 is a diagram illustrating a method of driving, by the touch driving circuit of the touch circuit, a touch electrode according to an embodiment.

Referring to FIG. 10, the panel 110 of a display device 1000 may include a plurality of channels CH1 to CH(3n). Furthermore, a plurality of sensing electrodes SE1 to SE(3n) (n is a natural number equal to or greater than 1) may be disposed in the panel 110.

The channels CH1 to CH(3n) of the touch circuit 140 may be connected to the sensing electrodes SE1 to SE(3n), respectively. Furthermore, each of the channels CH1 to CH(3n) may supply a driving signal to each of the sensing electrodes SE1 to SE(3n), and may receive a response signal from the sensing electrode to which the driving signal has been supplied.

The touch circuit 140 may drive two or more adjacent sensing electrodes SE1 to SE(3n) at different times. Due to such driving, each of the sensing electrodes SE1 to SE(3n) may not be driven simultaneously with an adjacent sensing electrode.

The touch circuit 140 may divide the plurality of sensing electrodes SE1 to SE(3n) into N groups (N is a natural number equal to or greater than 2), and may drive the N groups at different times. Here, each group may include sensing electrodes having a same remainder when dividing the orders of the disposition of the sensing electrodes by N.

For example, the touch circuit 140 may drive the sensing electrodes SE1, SE(n+1), and SE(2n+1), belonging to a first group, at a first time T1, may drive the sensing electrodes SE2, SE(n+2), and SE(2n+2), belonging to a second group, at a second time T2, and may drive the sensing electrodes SE(n), SE(2n), and SE(3n), belonging to an N-th group, at an N-th time Tn.

Furthermore, the touch circuit 140 may drive, in a power saving mode, a channel to which a driving signal is not supplied among the channels CH1 to CH(3n), or may not supply driving power to the corresponding channel.

As occasion demands, the touch circuit 140 may drive each channel by dividing a driving period into a display driving period and a touch driving period and one touch driving period may be divided into a plurality of time sections.

The number of groups and an interval in which each group is driven may be differently adjusted by considering a polarity of a touch driving voltage and the amount of decrease in a retransmission signal.

Figure 11:
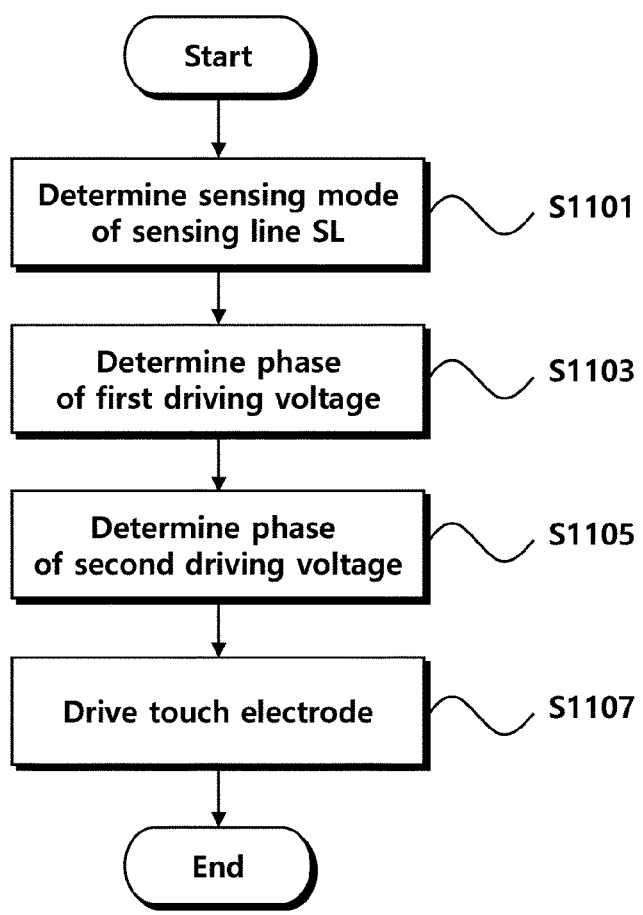
FIG. 11 is a flowchart describing a method of receiving a touch sensing signal in a sensing mode according to an embodiment.

FIG. 11 is a flowchart describing a method of receiving a touch sensing signal in the sensing mode according to an embodiment.

Referring to FIG. 11, the method 1100 of receiving a touch sensing signal may include step S1101 of determining a sensing mode of a touch sensing line, step S1103 of determining a phase of a first driving voltage, step S1105 of determining a phase of a second driving voltage, step S1107 of transmitting a driving signal to a touch electrode and receiving a touch sensing signal, etc.

In step S1101 of determining a sensing mode of a touch sensing line, a single mode or a differential mode may be selected as the sensing mode in FIGS. 8 and 9.

The single mode or the differential mode may be performed by a switch (not illustrated) of one circuit.

In the single mode in which touch sensing lines are individually controlled, each analog signal processing circuit (ADE) may receive a touch sensing signal and determine whether a touch is present, touch coordinates, etc.

In the differential mode in which a touch sensing line that receives a sensing signal having a common voltage polarity is connected and controlled, a circuit element for determining common noise of a touch sensing signal or determining a temperature change may be further included inside or outside the touch circuit 140, as occasion demands.

In step S1103 of determining a phase of a first driving voltage, the first driving voltage may be determined by considering a state of an adjacent touch electrode.

In step S1105 of determining a phase of a second driving voltage, the second driving voltage may be determined by considering a phase or polarity of the first driving voltage. In order to reduce retransmission between adjacent touch electrodes or sensing lines, the second driving voltage having a polarity opposite to a polarity of the first driving voltage may be determined.

The touch control circuit (not illustrated) may determine phases or polarities of the first driving voltage and the second driving voltage.

In step S1107 of transmitting a driving signal to a touch electrode and receiving a touch sensing signal, the determined first driving voltage and second driving voltage may be transmitted to the touch electrode. The touch sensing signal may be received based on a change in capacitance attributable to a touch or proximity of an object.

A touch electrode or touch sensing line to which the first driving voltage is transmitted and a touch electrode or touch sensing line to which the second driving voltage is transmitted may be differently defined as occasion demands, but touch electrodes or touch sensing lines that are crisscross alternated may be selected. For example, touch electrodes may be selected so that driving signals having different polarities for each touch electrode are disposed in a form, such as a checkerboard. For another example, touch sensing lines may be selected so that driving signals having different polarities are crisscross alternated and transmitted for each touch sensing line.

A change in capacitance attributable to a touch or proximity of an object may be received through each touch electrode or a touch sensing line based on the first driving voltage and the second driving voltage transmitted according to the above method. A signal into which corresponding data has been incorporated may be transmitted to the touch sensing circuit (not illustrated) of the read-out circuit.

Figure 12:
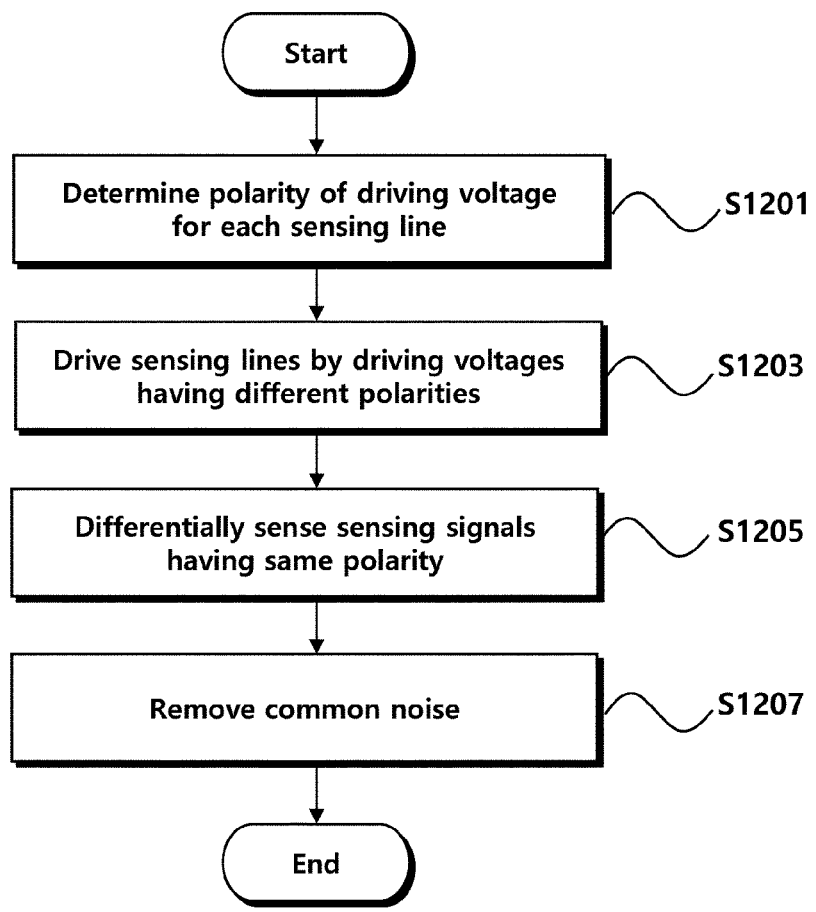
FIG. 12 is a flowchart describing a method of removing common noise of a touch sensing signal according to an embodiment.

FIG. 12 is a flowchart describing a method of removing common noise of a touch sensing signal according to an embodiment.

Referring to FIG. 12, the method 1200 of removing common noise of a touch sensing signal may include step S1201 of determining a polarity of a driving voltage for each touch sensing line, step S1203 of driving sensing lines by driving voltages having different polarities, step S1205 of differentially sensing the sensing signals having the same polarity, step S1207 of removing common noise for each group, etc.

In step S1201 of determining a polarity of a driving voltage for each touch sensing line, a polarity of a driving voltage may be determined for each touch sensing line by using the methods described with reference to FIGS. 6 to 11. It is possible to determine a polarity of a driving voltage for a touch electrode differently from another electrode in a touch sensing line. However, it is also possible to determine polarities of driving voltages for all touch electrodes included in one touch sensing line to be the same, as occasion demands.

In step S1203, two adjacent sensing lines may be driven by driving voltages having different polarities using the methods described with reference to FIGS. 6 to 11.

An optimal mixed driving arrangement, order, and time for preventing noise may be determined by transmitting driving voltages having different polarities in the LGM state. Polarities of the driving voltages may be determined for each sensing line. A preset mixed driving method may be changed over time.

For example, if a polarity of a first sensing line is a positive (P) polarity and a polarity of a second sensing line is a negative (N) polarity, after a lapse of a given time, the polarity of the first sensing line may be changed into the N polarity, and the polarity of the second sensing line may be changed into the P polarity.

In step S1205 of differentially sensing signals having the same polarity for each signal, a touch signal may be received through the differential sensing described with reference to FIG. 9.

A sensing mode in which a touch is sensed may be changed based on a state of the display device. Characteristics of common noise may be determined for each group. In order to remove the common noise, differential sensing may be performed.

In step S1207 of removing common noise for each group, common noise may be removed for each group based on signals of sensing lines that are connected in common.

A voltage, that is, a basis, may be provided to a common sensing line. Common noise may be determined based on the corresponding voltage.

What is claimed is:

1. A touch circuit comprising:
   a touch driving circuit configured to transmit a touch driving signal to a touch electrode;
   a touch sensing circuit configured to sense a change in capacitance, generated in the touch electrode, through a sensing line; and
   a touch control circuit configured to control a polarity of the touch driving signal transmitted by the touch driving circuit,
   wherein the polarity of the touch driving signal controlled by the touch control circuit is determined based on a location of the touch electrode, and
   wherein the touch control circuit determines polarities of touch sensing signals transmitted to the touch sensing circuit and determines common noise of the touch sensing signals of each group including the touch sensing signals having a same polarity.

2. The touch circuit of claim 1, wherein touch electrodes comprise a plurality of Tx electrodes and a plurality of Rx electrodes intersecting with each other, wherein the Tx electrodes receive touch driving signals having different polarities transmitted by the touch driving circuit and the Rx electrodes transmit, to the touch sensing circuit, touch sensing signals generated by a touch or proximity of an object.

3. The touch circuit of claim 1, wherein the touch driving circuit transmits a first touch driving signal to touch electrodes defined as one group and transmits a second touch driving signal, having a phase different from a phase of the first touch driving signal, to touch electrodes adjacent to the group of the touch electrodes.

4. The touch circuit of claim 1, wherein the touch control circuit controls touch driving voltages, transmitted to odd-numbered sensing lines and to even-numbered sensing lines in a direction, to respectively have different polarities.

5. The touch circuit of claim 1, wherein the touch sensing circuit comprises:
   an amplifier configured to amplify a touch sensing signal corresponding to a change in the capacitance generated in the touch electrode;
   a switch configured to receive a touch sensing mode signal, generated by the touch control circuit, to indicate a single mode or a differential mode and to select a connection between the amplifier and an analog-to-digital converter according to the touch sensing mode signal; and
   an analog-to-digital converter configured to convert the touch sensing signal in an analog form into the touch sensing signal in a digital form.

6. The touch circuit of claim 1, further comprising amplifiers, connected with sensing lines, to determine common noise of touch sensing signals.

7. The touch circuit of claim 6, wherein the amplifiers are connected with a common sensing line and compare signals received through the common sensing line to determine noise of each touch sensing signal.

8. The touch circuit of claim 6, wherein an amplifier is connected with a plurality of sensing lines of a same polarity and determines a difference between touch sensing signals of the connected sensing lines.

9. The touch circuit of claim 1, wherein the touch control circuit identifies noise of a touch sensing signal generated in a touch electrode and changes the intensity of a touch sensing signal.

10. The touch circuit of claim 1, wherein the touch control circuit controls the touch driving circuit to supply the touch driving signals having different polarities in different times.

11. A touch circuit comprising:
a read-out circuit configured to transmit a touch driving signal to a touch electrode and receive a touch sensing signal from the touch electrode; and
a touch control circuit configured to control the touch driving signal of the read-out circuit,
wherein the touch control circuit controls touch driving signals transmitted to two adjacent touch electrodes to have different polarities and determines polarities of sensing signals received from the two adjacent touch electrodes, and
wherein the touch control circuit determines the polarity of the touch sensing signal and controls an analog signal processing circuit such that a common sensing line is formed based on the polarity of the touch sensing signal.

12. The touch circuit of claim 11, wherein the read-out circuit comprises a plurality of analog signal processing circuits configured to receive the touch sensing signals respectively from different sensing lines.

13. The touch circuit of claim 11, wherein the read-out circuit comprises one or more common sensing lines and receives touch sensing signals having a same polarity through the one or more common sensing lines.

14. The touch circuit of claim 11, wherein the read-out circuit further comprises an amplifier to compare the touch sensing signals transmitted from the plurality of sensing lines.

15. The touch circuit of claim 13, wherein the touch control circuit calculates common noise of the touch sensing signals using the common sensing line.

16. A touch sensing method comprising:
determining a phase of a first touch driving voltage transmitted to a first touch electrode;
determining a phase of a second touch driving voltage, having an opposite polarity to a polarity of the first touch driving voltage, transmitted to the second touch electrode; and
alternately transmitting the first touch driving voltage and the second touch driving voltage to adjacent touch electrodes, and
forming common sensing lines in order to receive touch sensing signals having same polarities as those of the first touch driving voltage and the second touch driving voltage and calculating a common noise for each group including touch sensing signals having a same polarity.

17. The touch sensing method of claim 16, further comprising determining whether polarities of touch sensing signals transmitted from the first touch electrode and the second touch electrode are identical.

18. The touch sensing method of claim 16, further comprising:
defining touch sensing signals having a same polarity as a group, and
simultaneously sensing the touch sensing signals of each group.

* * * * *